(12) United States Patent
Tanaka (10) Patent No.: US 8,543,173 B2
(45) Date of Patent: Sep. 24, 2013

(54) PORTABLE ELECTRONIC DEVICE AND WIRELESS COMMUNICATION DEVICE

(75) Inventor: Kensaku Tanaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 112 days.

(21) Appl. No.: 12/865,209

(22) PCT Filed: Jan. 30, 2009

(86) PCT No.: PCT/JP2009/051663
§ 371 (c)(1),
(2), (4) Date: Jul. 29, 2010

(87) PCT Pub. No.: WO2009/096567
PCT Pub. Date: Aug. 6, 2009

(65) Prior Publication Data
US 2010/0331057 A1    Dec. 30, 2010

(30) Foreign Application Priority Data
Jan. 30, 2008   (JP) ................................ 2008-019978

(51) Int. Cl.
*H04M 1/00*   (2006.01)

(52) U.S. Cl.
USPC ........ 455/574; 455/571; 455/13.4; 455/127.1

(58) Field of Classification Search
USPC .................. 455/571–574, 13.4, 127.1–127.5, 455/423, 67.11–67.14, 115.2, 226.1
See application file for complete search history.

(56) References Cited

U.S. PATENT DOCUMENTS

| | | | |
|---|---|---|---|
| 2006/0109009 A1* | 5/2006 | Banke et al. | 324/536 |
| 2007/0052424 A1* | 3/2007 | Okumura | 324/432 |
| 2008/0200220 A1* | 8/2008 | Jackson | 455/574 |
| 2009/0098914 A1* | 4/2009 | Martin-Cocher et al. | 455/572 |

FOREIGN PATENT DOCUMENTS

| | | |
|---|---|---|
| JP | 05-022834 | 1/1993 |
| JP | 08-037720 | 2/1996 |
| JP | 09-319941 | 12/1997 |
| JP | 10-322878 | 12/1998 |
| JP | 2001-197197 A | 7/2001 |
| JP | 2004064291 | 2/2004 |
| JP | 2006-271077 | 10/2006 |
| JP | 2007-071632 A | 3/2007 |

OTHER PUBLICATIONS

International Search Report from PCT/JP2009/051663 dated Mar. 3, 2009.
Notification of Reasons for Refusal dated Jul. 17, 2012, issued in counterpart Japanese Application No. 2008-019978.

* cited by examiner

*Primary Examiner* — Chuong A Ngo
(74) *Attorney, Agent, or Firm* — Procopio, Cory, Hargreaves & Savitch LLP (57) ABSTRACT

A control unit monitors a current value measured by a power control unit and a type of application program being executed, and executes a reset process or a power-off process when the current value measured by the power control unit exceeds a current threshold value corresponding to the type of application program currently being executed.

11 Claims, 9 Drawing Sheets

NORMAL CURRENT TABLE 160

| TABLE NO. | OPERATION MODE A | CURRENT DETERMINATION VALUE B [mA] | CURRENT ABNORMALITY DETERMINATION TIME PERIOD E (S) | OPERATION MODE REGISTER C | NON-USE DETERMINATION TIME PERIOD D(S) |
|---|---|---|---|---|---|
| 1 | SLEEP | 10 | 360 | D0 | 360 |
| 2 | PHONE CALL | 800 | 60 | D1 | 120 |
| 3 | MAIL APPLICATION | 300 | 300 | D2 | 300 |
| 4 | WAP | 800 | 60 | D3 | 120 |
| 5 | DSA | 600 | 180 | D5 | 150 |
| 6 | MUSIC PLAY APPLICATION | 120 | 300 | D6 | 360 |
| 7 | ONE-SEG WATCHING | 360 | 300 | D7 | 120 |
| 8 | OVERCURRENT | 900 | 0 | D8 | -(0) |

PORTABLE ELECTRONIC DEVICE AND WIRELESS COMMUNICATION DEVICE

TECHNICAL FIELD

The present invention relates to a portable electronic device and a wireless communication device which execute a reset process or a power-off process according to the situation.

A portable electronic device, particularly, a highly functionalized mobile phone, might become an abnormal state due to the trouble of a software bug or the like. In this case, generally an unnecessary current flows, which is undesirable from the point of view of power saving, and it is preferable to perform the recovery from the abnormal state as soon as possible.

Figure 8:
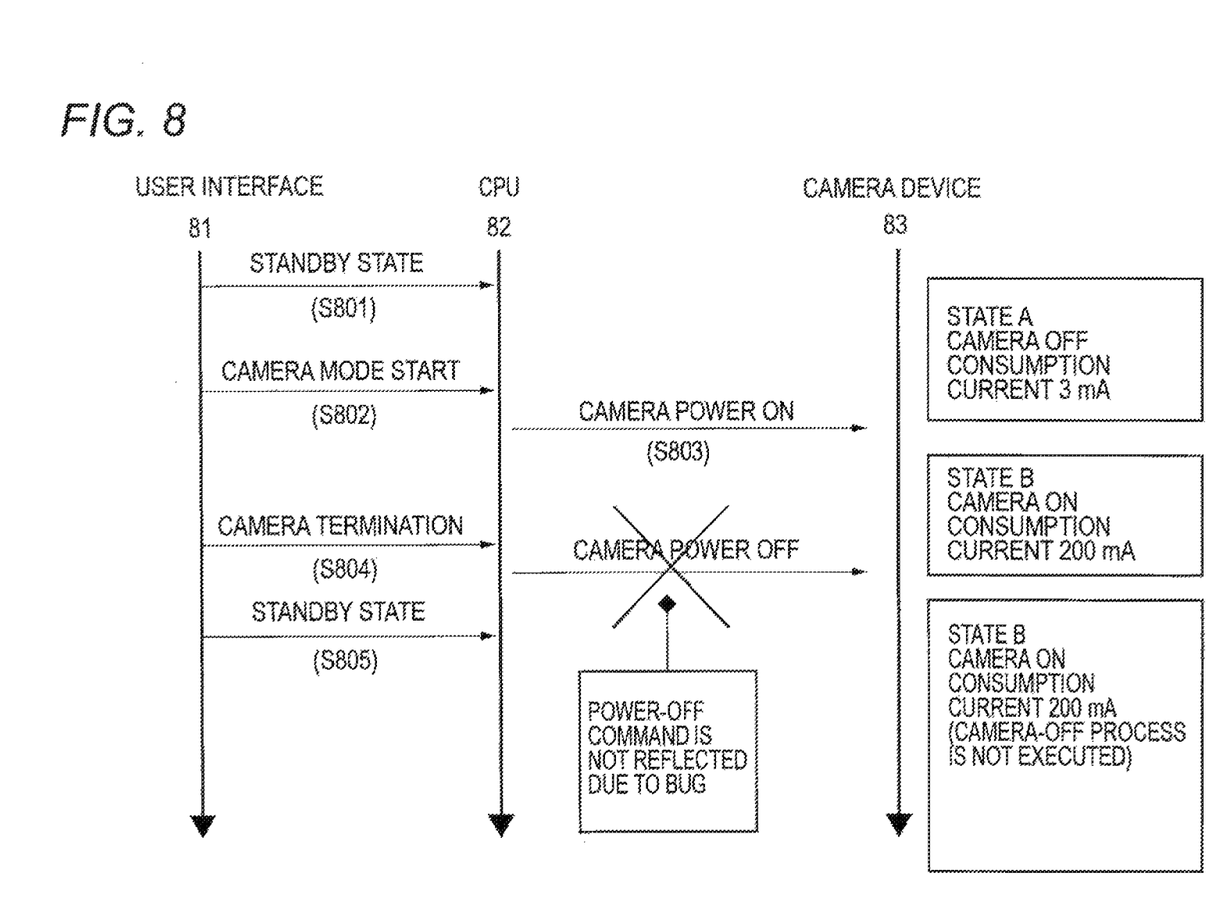
FIG. 8 is a sequence diagram showing an operation flow of a mobile phone of a related art in which a current is increased due to a software bug.

FIG. 8 is an example showing the operation of the mobile phone in which a current is increased by a software bug. Here, an operation sequence among a user interface 81, a mobile phone main body (CPU 82), and a camera device 83 is shown.

Here, a consumption current of 200 mA is set at the time of using the camera device 83, and it is necessary to turn off a power supply of the camera device 83 so as to reduce the current consumption in a standby state (state A).

The normal consumption current of the standby state is about 3 mA.

In FIG. 8, when the camera device 83 is used in the mobile phone in the standby state (step S801), a user sets the mobile phone to a camera mode via the user interface 81 (step S802).

In the camera mode, the CPU 82 performs a process of powering on the camera device 83 (step S803).

At this time, a consumption current becomes 200 mA indicated by a state B. When the camera mode is terminated (step S804), the CPU 82 performs a power-off process for the camera device 83. However, if information for giving a power-off instruction by some bug does not reach the camera device 83 and a camera-off process is not executed, although the consumption current should be about 3 mA of the state A under normal circumstances since the mobile phone is in the standby state (step S805), an unnecessary current of 200 mA would be consumed since the camera device 83 is turned on due to the bug.

When an invisible software bug occurs, the consumption current of the mobile phone may mostly be increased, a battery would run out faster than in normal use, and the battery lifetime would become short. Conventionally, for a rapid recovery from such an abnormal state, there has been known a mobile phone which shuts down a power supply by manually pushing a reset button, instead of removing the battery at the time of an unexpected operation, and performs the recovery by re-supplying power (for example, see JP-A-2004-64291).

DISCLOSURE OF THE INVENTION

Problem to be Solved by the Invention

However, according to the technique disclosed in JP-A-2004-64291, it is necessary for a user to push the reset button at the time of a visible abnormal operation such as a freeze or malfunction, and usability is not good.

An object of the present invention is to provide a portable electronic device and a wireless communication terminal capable of appropriately executing a reset process or a power-off process.

Means for Solving the Problem

A portable electronic device according to an embodiment of the present invention, includes: a battery; a current measurement unit which is connected to the battery and measures a current, the current being output from the battery and flowing through an output current monitoring resistor; a control unit which executes a plurality of various application programs; and a storage unit which stores a current threshold value set for each of the plurality of application programs executable by the control unit, wherein the control unit monitors a current value measured by the current measurement unit and a type of application program being executed, and executes a reset process or a power-off process when the current value measured by the current measurement unit exceeds a current threshold value corresponding to the type of application program currently being executed.

The above portable electronic device may include a nonvolatile storage unit, and when the current value measured by the current measurement unit exceeds the current threshold value corresponding to the type of application program currently being executed, the control unit may store information indicating the type of application program currently being executed in the nonvolatile storage unit.

The storage unit may store an overcurrent threshold value which is a value greater than any of the current threshold values as well as the current threshold value set for each application program, and the control unit may forcibly execute the power-off process in response to the number of times that the current value measured by the current measurement unit exceeds the overcurrent threshold value reaching a predetermined number of times, regardless of the application program being executed. Herein, the predetermined number of times may be one or a plural number.

The storage unit may store an overcurrent threshold value which is a value greater than any of the current threshold values as well as the current threshold value set for each application program, and the control unit may execute the reset process in response to the current value measured by the current measurement unit exceeding the overcurrent threshold value.

Herein, the control unit may execute the reset process in response to the current value measured by the current measurement unit exceeding the overcurrent threshold value until the number of times that the current value measured by the current measurement unit exceeds the overcurrent threshold value reaches a predetermined number of times, and the control unit may forcibly execute the power-off process in response to the number of times that the current value measured by the current measurement unit exceeds the overcurrent threshold value reaching the predetermined number of times, regardless of the application program being executed.

Further, the control unit may start a time measurement when detecting a state where the current value measured by the current measurement unit exceeds the current threshold value set for each of the plurality of application programs, and may execute the reset process when the state has continued for a first predetermined time period.

Herein, the control unit may execute the reset process while using a different time period for each of the plurality of application programs as the first predetermined time period.

Further, the control unit may monitor a generation of an interrupt process, and at the time of executing the reset process, the control unit may execute the reset process in response to becoming a non-use state where the generation of the interrupt process does not occur for a second predetermined time period.

Herein, the control unit may execute the reset process while using a different time period for each of the plurality of application programs as the second predetermined time period.

A wireless communication device according to another embodiment of the present invention, includes: a battery; a current measurement unit which is connected to the battery and measures a current, the current being output from the battery and flowing through an output current monitoring resistor; a communication unit which performs wireless communication; a control unit which can execute a plurality of application including an application program for controlling communication by the communication unit and a storage unit which stores a current threshold value set for each of the plurality of application programs executable by the control unit, wherein the control unit monitors a current value measured by the current measurement unit and a type of application program being executed, and executes a reset process or a power-off process when the current value measured by the current measurement unit exceeds a current threshold value corresponding to the type of application program currently being executed.

Effects of the Invention

According to a portable electronic device of the present invention, it is possible to appropriately execute a reset process or a power-off process.

EXPLANATION OF REFERENCE

100: Mobile phone
10: Power control unit (30: Battery, 31: Power supply unit, 32: Current amplifier)
11: Communication unit
12: Operation unit
13: Audio input/output unit
14: Display unit
15: Imaging unit
16: Storage unit (160: Normal current table)
17: Nonvolatile storage unit
18: Control unit
19: System bus

BEST MODE FOR CARRYING OUT THE INVENTION

Figure 1:
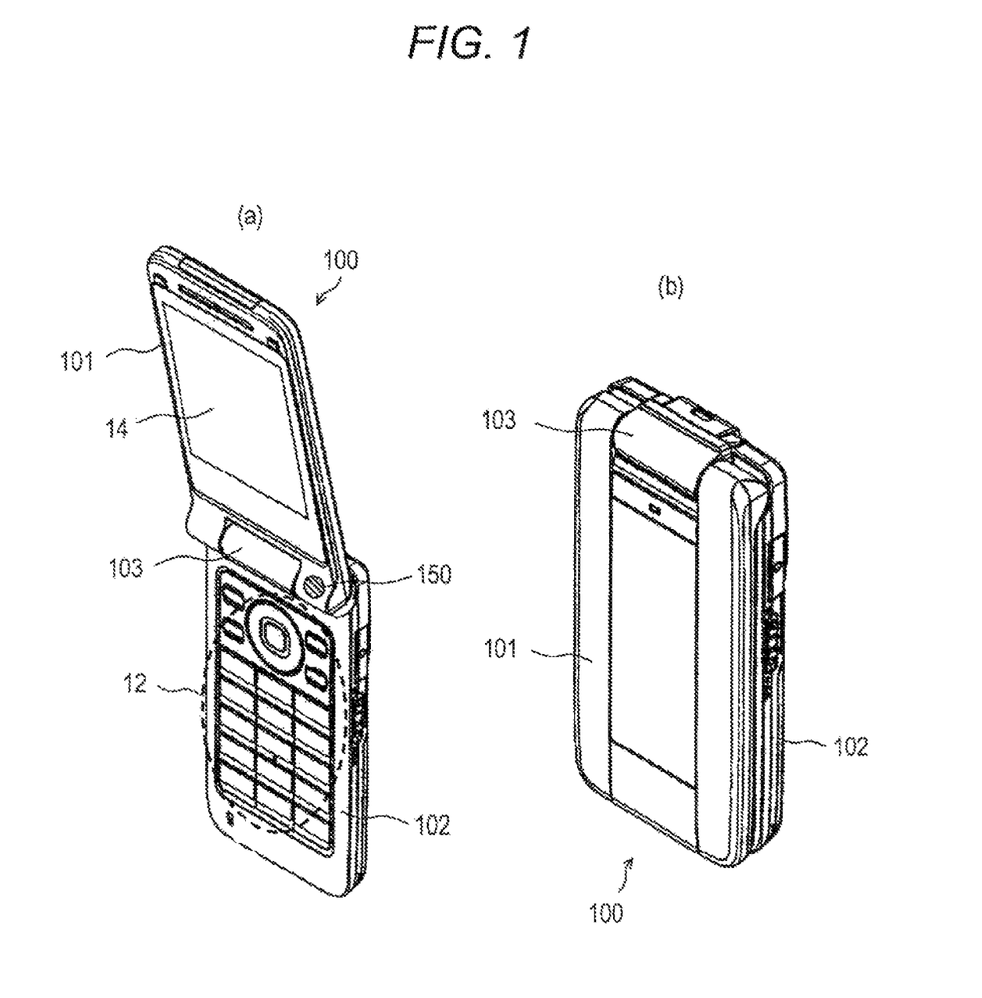
FIG. 1 is a diagram showing an example of the external structure of a portable electronic device according to an embodiment of the present invention.

FIG. 1 is a diagram showing an example of the external structure of a portable electronic device according to an embodiment of the present invention. Herein, a folding type mobile phone 100 is assumed as a portable electronic device. The mobile phone 100 is also an example of a wireless communication device according to an embodiment of the present invention.

As shown in FIG. 1, the mobile phone 100 has an upper casing 101, a lower casing 102, and a hinge unit 103.

FIG. 1(a) is a diagram showing a state (open state) in which the mobile phone 100 is open, and FIG. 1(b) is a diagram showing a state (closed state) in which the mobile phone 100 is folded.

As shown in FIG. 1(a), the display unit 14 is provided on one surface of the upper casing 101 which is not externally exposed in the closed state of the mobile phone 100 shown in FIG. 1(b).

As shown in FIG. 1(a), the operation unit 12 is provided on one surface of the lower casing 102 which is not externally exposed in the closed state of the mobile phone 100 shown in FIG. 1(b).

The hinge unit 103 is a hinge mechanism having a rotary shaft which allows opening/closing the upper casing 101 and the lower casing 102 to transit the mobile phone 100 between the open state shown in FIG. 1(a) and the closed state shown in FIG. 1(b). The open state/closed state of the mobile phone 100 is monitored by a control unit 18 to be described later. The control unit 18 is able to detect the closed state of the mobile phone 100.

Specifically, for example, the control unit 18 detects the closed state by monitoring whether or not a detection switch (not shown) of the lower casing 102 is pushed by a projection portion (not shown) provided on the upper casing 101 (that is, the state is determined as the closed state when the detection switch is pushed, and otherwise, the state is determined as the open state). The opening/closing detection is not limited to the switch, and may be performed by various sensors.

Figure 2:
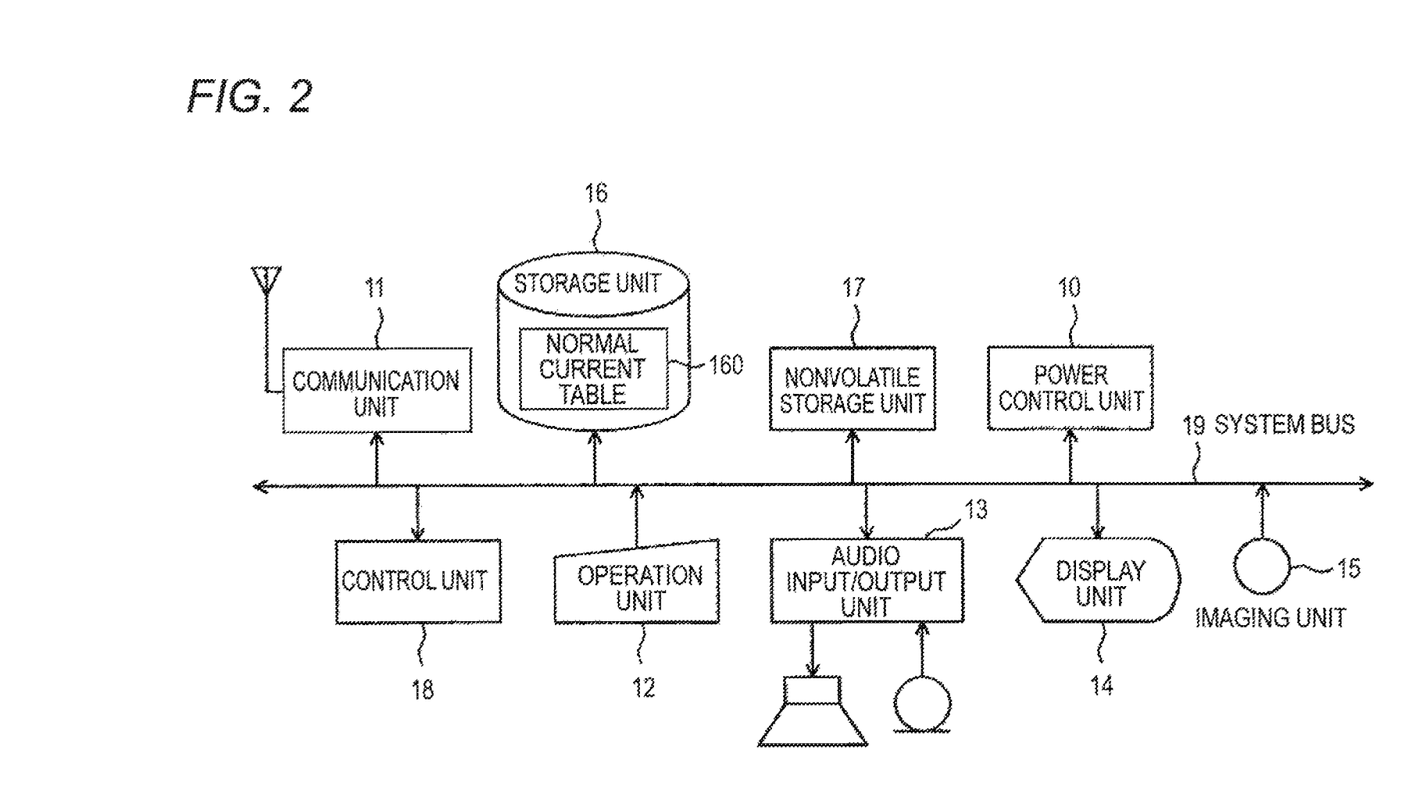
FIG. 2 is a block diagram showing an example of the internal configuration of the portable electronic device according to an embodiment of the present invention.

FIG. 2 is a block diagram showing an example of the internal configuration of the portable electronic device according to an embodiment of the present invention. As shown in FIG. 2, the mobile phone 100 uses the control unit 18 as a control center and is configured by including a power control unit 10, a communication unit 11, an operation unit 12, an audio input/output unit 13, a display unit 14, an imaging unit 15, a storage unit 16, a nonvolatile storage unit 17, and the control unit 18 being commonly connected to a bidirectional system bus 19 including a plurality of lines for an address, data, and control.

Figure 3:
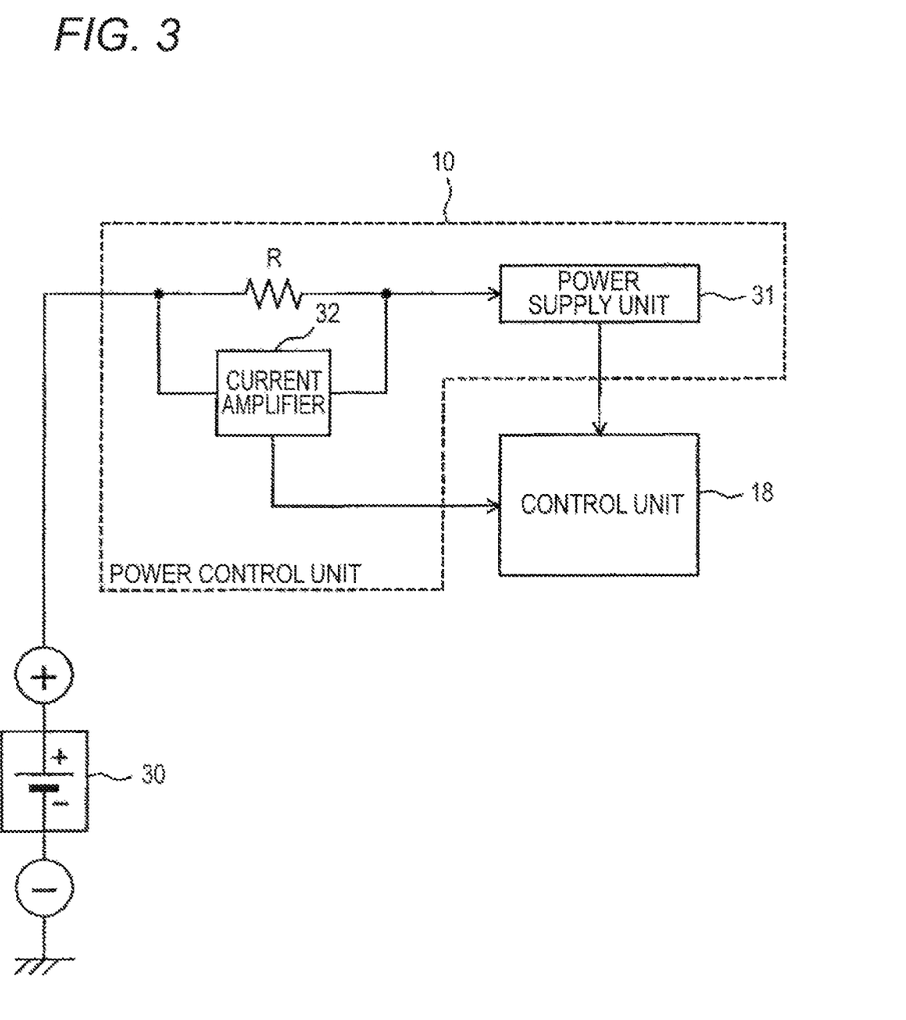
FIG. 3 is a block diagram showing an example of the internal configuration of a power control unit provided in the portable electronic device according to an embodiment of the present invention.

For example, the power control unit 10 includes a power supply unit 31 and a current amplifier 32 as shown in the example of the internal configuration in FIG. 3.

The power supply unit 31 supplies each configuration block constituting the mobile phone 100 with an output current obtained from a battery 30 via a current monitoring resistor R connected to the battery 30. The current amplifier 32 connected to both ends of the current monitoring resistor R amplifies a voltage dropped by the current monitoring resistor R, and supplies the amplified voltage to the control unit 18.

The current amplifier 32 includes a high-power voltage amplifier and an AD (Analog to Digital) converter of about 8 bits, for example. When a maximum measurement current were 1A, it would be possible to measure a current at a resolution to 1A/8 bits (256)=0.003906A.

Accordingly, it is possible to accurately measure a current from a low consumption current of several mA as in a standby time to a large current at a wireless transmission time and an abnormal current leading to heat generation.

The communication unit 11 captures a wireless communication system, wirelessly communicates with a base station (not shown) connected to a communication network, and transmits/receives various data. The various data includes audio data at the time of audio communication, mail data at the time of mail transmission/reception, web page data at the time of web browsing, and the like.

For example, the operation unit 12 has keys assigned with various functions such as a power key, a call key, numeric keys, character keys, direction keys, an enter key, a send key, action keys, and the like. When the keys is operated by an operator, the operation unit 12 generates a signal corresponding to operation content and outputs the generated signal as an instruction of the operator to the control unit 18.

The audio input/output unit 13 executes an input/output process for an audio signal output from a speaker or an audio signal input to a microphone.

That is, the audio input/output unit 13 amplifies an audio input from the microphone, performs analog/digital conversion for the amplified audio, performs signal processing such as encoding or the like, converts the signal processing result into digital audio data, and outputs the digital audio data to the control unit 18. The audio input/output unit 13 performs signal processing such as decoding, digital/analog conversion, and amplification, and the like for audio data supplied from the control unit 18, converts the signal processing result into an analog audio signal, and outputs the analog audio signal to the speaker.

The display unit 14 is configured by an LCD (Liquid Crystal Display Device) or OLED (Organic Light Emitted Diode), which displays an image according to a video signal supplied from the control unit 18.

The display unit 14 performs display based on an application program being executed, for example, displays a phone number of a transmission destination upon wireless transmission by the communication unit 11, a phone number of a transmission source upon reception, content of a reception mail or a transmission mail, a date, a time, a remaining battery level, transmission success and failure, a standby screen, and the like.

The imaging unit 15 is a camera configured by a photoelectric conversion element such as a CCD (Charge Coupled Device) or CMOS (Complementary Metal Oxide Semiconductor) image sensor or a control circuit thereof The storage unit 16 stores various data to be used for various processes of the mobile phone 100. For example, a program of a computer to be executed by the control unit 18, an address book for managing personal information such as a phone number of a communication opponent or an electronic mail address, an audio file for reproducing a ring tone or an alarm tone, an image file for the standby screen, various setting data, and temporary data for use in a process of a program are stored.

In particular, a current threshold (a normal current table 160) set for each application program and an overcurrent threshold value greater than any of the current thresholds are stored. An example of a data structure of the normal current table 160 is shown in FIG. 4.

Figure 4:
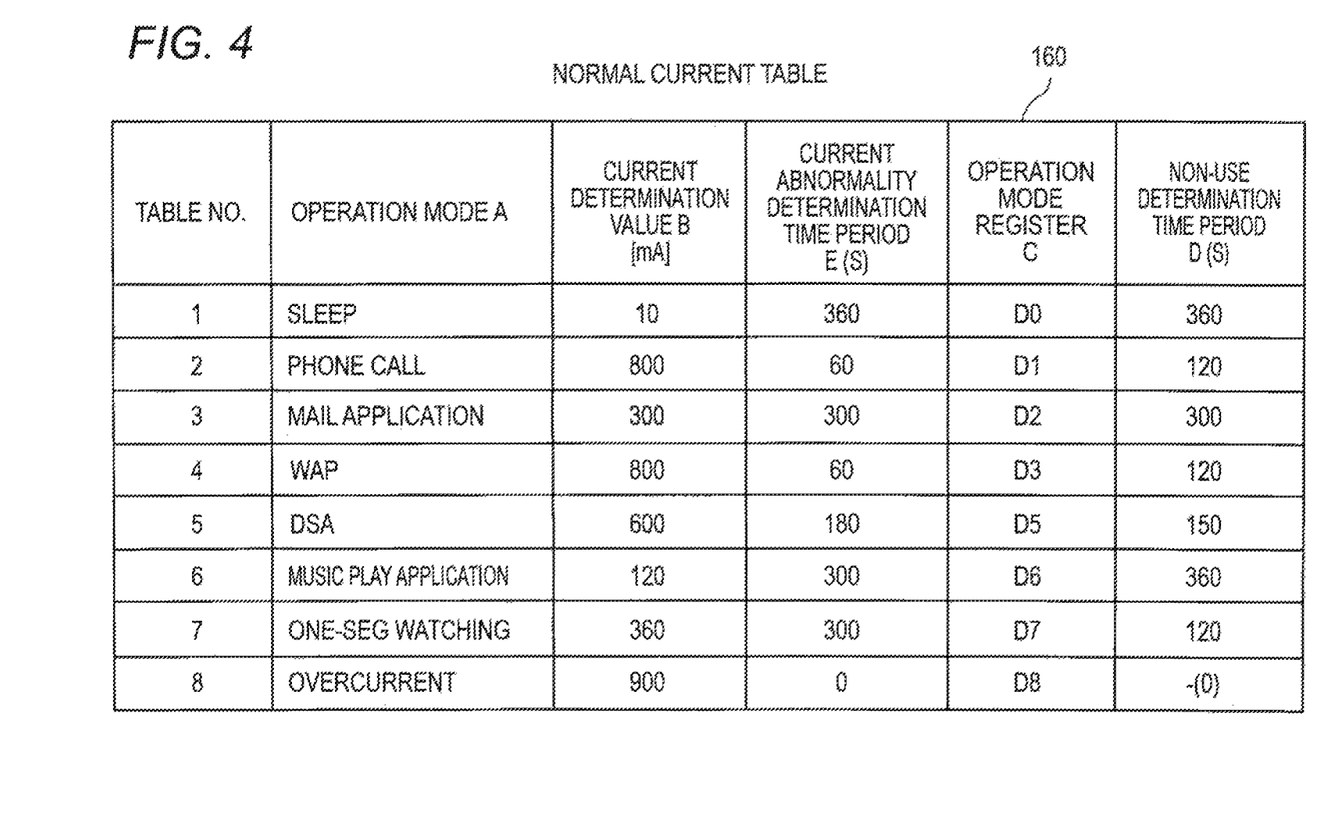
FIG. 4 is a diagram showing an example of a data structure of a storage unit (normal current table 160) provided in the portable electronic device according to an embodiment of the present invention.

As shown in FIG. 4, the normal current table 160 includes data items of an operation mode A, a current determination value B [mA], an abnormal current determination time period E (s), an operation mode register C, and a non-use determination time period D [s] for each table No. (entry).

Here, as the operation mode A, a type of application program (hereinafter, referred to as application) (for example, a sleep application, a call application, a mail application, a WAP (Wireless Application Protocol), a DSA (Download Service Application Program), a music play application, or a One-Seg application) is shown. For example, the call application is an application which controls communication of the communication unit 11. For each of the application types, an abnormality determination threshold value (current determination value B [mA]) is defined. A duration time period of a current greater than the threshold value is counted for each application. A current abnormality determination condition is defined as the current abnormality determination time period E [s] in relation to the duration time period. In consideration of the usability of the user, a delay time is set as the non-use determination time period D until a reset operation is performed for each application. A dangerous current threshold value is commonly defined in a table No. 8 for the applications.

For example, the storage unit 16 is constituted by a nonvolatile storage device (a nonvolatile semiconductor memory, a hard disc device, an optical disc device, or the like) or a randomly accessible storage device (for example, SRAM or DRAM).

In the nonvolatile storage unit 17, for example, a register (operation mode register) is assigned. When a current value measured by the power control unit 10 exceeds a current threshold value corresponding to a type of application program currently being executed, information indicating the type of application program is stored in the nonvolatile storage unit 17. Details thereof will be described later.

The control unit 18 entirely controls an overall operation of the mobile phone 100.

That is, the control unit 18 controls an operation of each block (signal transmission/reception in the communication unit 11, image display in the display unit 14, and an imaging process in the imaging unit 15) described above so that various processes of the mobile phone 100 (audio communication via a circuit switched network, the creation and transmission/reception of an electronic mail, browsing of a Web (World Wide Web) site on the Internet, and the like) are executed in an appropriate procedure according to an operation of the operation unit 12.

The control unit 18 has a computer (microprocessor) to execute a process on the basis of a program (an operating system, an application program, or the like) stored in the storage unit 16. The above-described process is executed according to a procedure indicated in the program. That is, a process is executed by sequentially reading command codes from the program of the operating system or the application program stored in the storage unit 16.

The mobile phone 100 intermittently receives a signal from a base station in a standby state for wireless communication. When an operation to the operation unit 12 is not performed for a predetermined time period, the control unit 18 becomes a sleep state at the timing when intermittent reception is not performed. The sleep state of the control unit 18 is released when an operation is performed to the operation unit 12 or a timing of the intermittent reception is reached.

The control unit 18 has a function including monitoring a current value measured by the power control unit 10 and a type of application program being executed, and when a current value measured by the power control unit 10 exceeds a current threshold value corresponding to a type of application program being executed, executing a reset process, or executing a power-off process by the battery 30. Herein, the reset process is to forcibly stop an application program. The power-off process is to completely turn off the power supply by the battery 30 and to turn off the mobile phone 100.

When the current value measured by the power control unit 10 exceeds the current threshold value corresponding to the type of application program currently being executed, the control unit 18 has a function of storing information indicating the type of application program in the nonvolatile storage unit 17.

Further, the control unit 18 has a function of forcibly executing the power-off process, regardless of an application program being executed, in response to that the current value measured by the power control unit 10 exceeds an overcurrent value. The control unit 18 has a function of executing the power-off process at a timing when the number of times that the current value exceeds the overcurrent value reaches a predetermined number of times.

The control unit 18 has a function of starting a time measurement when detecting a state where the current value measured by the power control unit 10 exceeds the threshold value set for each application program and is less than the overcurrent value, and executing the reset process when the state has continued for a predetermined time period. At this time, the control unit 18 executes the reset process using a different time period for each application program as a predetermined time period.

The control unit 18 has a function of monitoring an interrupt process and executing the reset process when becoming a non-use state where there is no interrupt for a predetermined time period.

Details of each function provided in the above-described control unit 18 will be described later.

Hereinafter, the basic operation of the portable electronic device according to an embodiment of the present invention described above will be schematically described using FIGS. 1 to 4.

That is, the control unit 18 executes a system reset (reset process) when the current value measured by the power control unit 10 exceeds the current determination value defined in the normal current table 160 stored in the storage unit 16 as a result of monitoring a current during the execution of some application, but executes the system reset by counting a time period (a non-use determination time period D) for which the user does not use the mobile phone 100 when the current value is not an overcurrent value resulting in abnormal heat generation.

Thereby, it is possible to avoid the inconvenience that the system reset is generated while the user uses the mobile phone 100. The control unit 18 is able to determine the non-use determination time period by monitoring the generation of an interrupt process and counting a time period for which the interrupt is not detected.

The reset process is as unnoticeable as possible by setting the non-use determination time period D [s] for each application as being long. In contrast, when a current value is a value which can cause heat generation, the reset process is immediately executed if a condition is satisfied, regardless of use or non-use of the user. When the recovery from a state in which the overcurrent flows is not possible even though the system reset is performed a plurality of times, the power supply is turned off and the operation of the mobile phone 100 is stopped by determining that the recovery is impossible (by an abnormality due to device destruction or the like).

An operation mode register C is allocated to each application. When an abnormality has occurred during the execution of some application, a register bit allocated to the application (operation mode) is set to "1" and further a detected current value thereof is retained. The content of the mode register C and the abnormal current value are stored in the nonvolatile storage unit 17.

Thereby, for example, when an abnormal state is not continuous by the removal of the battery 30 or the like (the recovery from a bug problem to the normal state is usually performed by removing the battery 30 for reactivation), a manufacturer or the like brought in for repair can check a situation where an abnormality has occurred, so that the effect of fast and accurate analysis can also be achieved. An example of the register is described, but any other memory of a nonvolatile storage means may be used.

Figure 5:
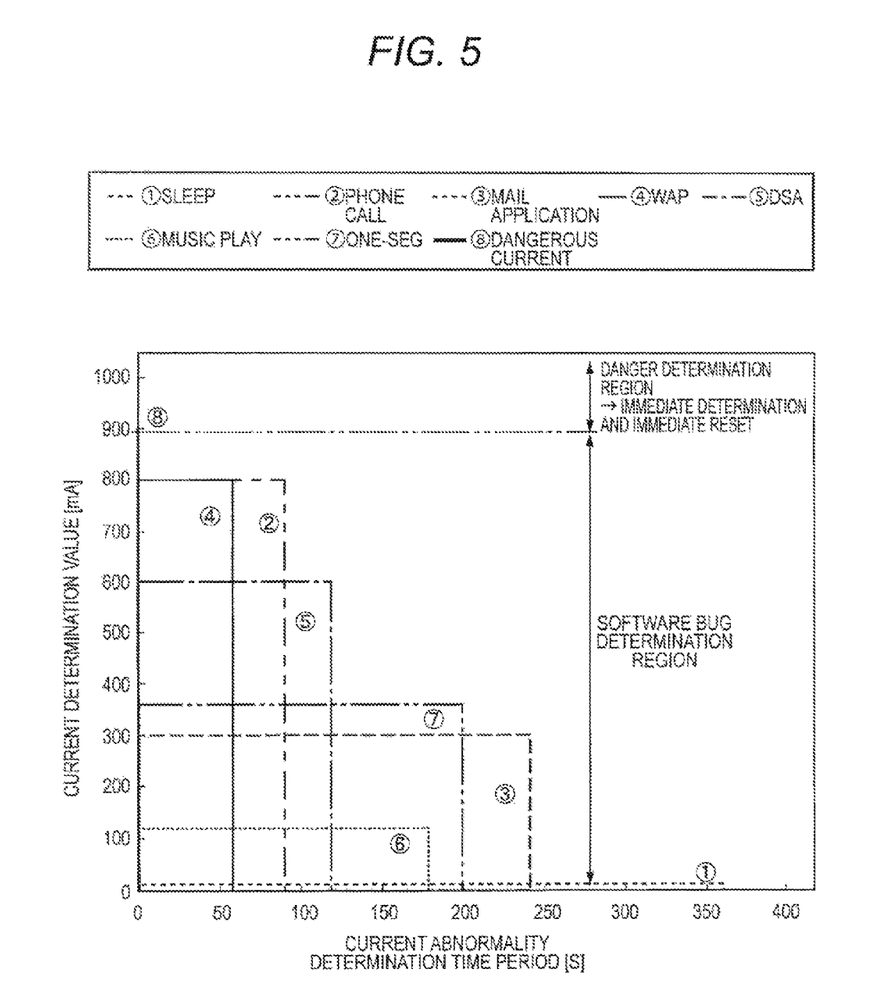
FIG. 5 is a diagram showing a graph of the relationship between a current determination value and a current abnormality determination time period in each operation mode of the portable electronic device according to an embodiment of the present invention.

FIG. 5 is a diagram showing a graph of the relationship between a current determination value and a current abnormality determination time period. As shown in FIG. 5, for example, referring to the table No. 1 of the normal current table 160, the control unit 18 determines that the state is abnormal when a current of 10 [mA] or more is flowing for 360 [s] or more in the sleep time. In a calling state, an error is not determined in the same condition as that of the sleep time since a current determination value and time of the calling state are applied.

That is, referring to a table No. 2 of the normal current table 160, the control unit 18 determines that the state is abnormal when a current of 800 [mA] or more is flowing for 60 [s] or more in the calling state. When a current of more than 900 [mA] is flowing, the control unit 18 immediately determines that the state is abnormal regardless of an application in execution (operation mode).

Figure 6:
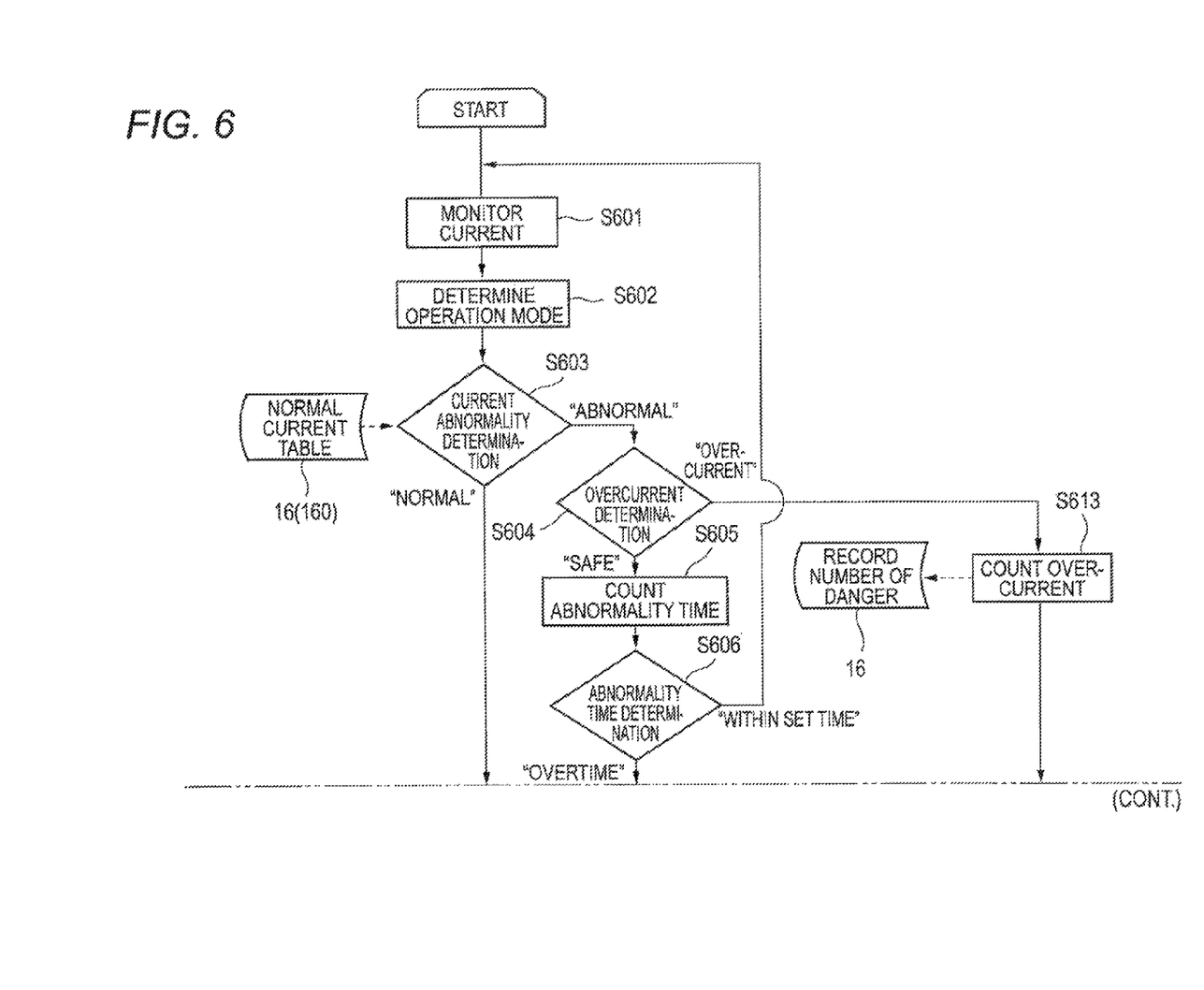
FIG. 6 is a flowchart showing the basic operation of the portable electronic device according to an embodiment of the present invention.

FIG. 6 is a flowchart showing the detailed operation of the portable electronic device according to an embodiment of the present invention. In FIG. 6, the solid-line arrow represents the sequence flow and the dotted-line arrow represents the data read/write (R/W).

Hereinafter, the operation of the portable electronic device according to an embodiment of the present invention shown in FIGS. 1 to 5 will be described with reference to the flowchart of FIG. 6.

First, the control unit 18 monitors a current flowing through a current monitoring resistor R on the basis of a current measured by the power control unit 10 (step S601: current monitoring). For example, the monitoring timing is every 5.12 second in the case of intermittent reception of CDMA (Code Division Multiple Access).

Next, the control unit 18 determines a type of application currently being executed (step S602: operation mode determination). The monitored current value is compared to a current determination value B [mA] of the operation mode of a corresponding application defined in the normal current table 160 stored in the storage unit 16 (step S603: current abnormality determination). Herein, when the monitored current value exceeds the current determination value B ("abnormal" in S603), it is determined whether or not the monitored current value exceeds a dangerous current of, for example, 900 [mA] (step S604: dangerous current determination). When the monitored current value does not exceed the dangerous current value ("safe" in step S604), an abnormal time in which the current value has exceeded the current determination value is counted (step S605: abnormality time counting).

Next, the control unit 18 makes an abnormality time determination (step S606). When a current abnormality count value continues for more than an operation abnormality determination time period E defined in the normal current table 160 stored in the storage unit 16 ("time lapse" in step S606), an error recording process is executed by determining that the operation is abnormal (step S607). Herein, the error recording process is a process of setting the operation mode register defined in the normal current table 160 corresponding to the operation mode in which the error has occurred to "1", and also storing a current value thereof. The operation mode register and the current value are allocated to the nonvolatile storage unit 17 and are set in a predetermined error storage region. Thereafter, the control unit 18 executes the reset process when the user does not use the mobile phone (step S612: system reset).

The time period (non-use time period) in which the user does not use the mobile phone is measured by the control unit 18 by performing interrupt monitoring (step S608: interrupt determination) and counting the time period in which the interrupt has not continuously occurred (step S609: non-use time counting). A value of a non-use counter (a counter allocated onto a program) returns to "0" when the interrupt has occurred and an interrupt-free time period is re-counted (step S610: non-use counter reset).

Subsequently, the control unit 18 determines the non-use of the mobile phone by referring to the non-use counter (step S611). When the non-use counter value exceeds the non-use determination time period D defined in the normal current table 160 in the non-use determination, the control unit 18 executes the system reset process (step S612), and returns to the current monitoring process of step S601.

As described above, the non-use determination time period D [s] is set for each operation mode. The non-use time counting (step S609) and the non-use determination (step S611) are performed at the same timing as that of the above-described current monitoring.

On the other hand, when it is determined that the overcurrent occurs ("overcurrent" in step S604), the control unit 18 adds the number of times that the overcurrent is determined to occur (an overcurrent count value) (step S613: overcurrent counting), and the number of times that the overcurrent is determined to occur is kept in a predetermined region of the storage unit 16. At this time, the control unit 18 further executes the error recording process (step S614). Herein, the error recording process is a process of setting the operation mode register defined in the normal current table 160 corresponding to the operation mode in which the error occurs to "1", and also storing an overcurrent value thereof. The operation mode register and the current value are allocated to the nonvolatile storage unit 17 and are set in a predetermined error storage region.

Subsequently, when the number of times that the overcurrent is determined to occur is equal to or greater than the predetermined number of times (a value of xx) ("value of xx or more" in step 5616) by referring to the overcurrent count value (S616: supply stop determination), the control unit 18 determines that the recovery by the system reset process is impossible (an increase of a current due to device destruction or the like). The number of times that the overcurrent is determined to occur is reset and also the power supply is stopped to prevent a state such as heat generation (the power-off process) (step S617). Then, the operation of the mobile phone 100 is stopped. On the other hand, when the number of times that the overcurrent is determined to occur is less than the value of xx ("value of less than xx" in step S616), the system reset process is executed regardless of the use or non-use of the user (step S612). At this time, the number of times that the overcurrent is determined to occur is not reset. The predetermined number of times (the value of xx) for determining that the recovery by the system reset process is impossible may be one or a plural number.

In the meantime, generally, the current is increased when the system is abnormal. Accordingly, it is possible to solve a problem of a manual operation to be performed by the user by monitoring a current as described above, comparing the monitored current to a normal current value defined in the normal current table 160 stored in the storage unit 16, and automatically executing the system reset process in the case of determining that the error has occurred.

That is, conventionally, it is necessary for the user to perform a reset operation at the time of an abnormal operation, but the normal recovery is automatically possible by the control unit 18 determining that the error occurs according to the portable electronic device related to an embodiment of the present invention. Thereby, it is possible to recover the normal state without pushing a reset button which is an operation the user has strong resistance.

Further, it is possible to detect a bug of software or hardware, which appears normal on a user interface as well as a visible abnormal operation such as a freeze or the like by the above-described current monitoring, and it is possible to reduce the useless current consumption occurring at the time of an abnormal operation by rapidly performing the normal recovery. Further, the recovery to the normal state is possible without stopping an operation of a phone call or mail creation by determining the timing at which the user operates the terminal after the abnormality is detected by the above-described current monitoring and executing a system reset process, and it is possible to contribute to improving the usability.

In this regard, the number of occurrences of the overcurrent is counted for the overcurrent resulting in heat generation, and a control operation is performed to stop the power supply by determining that the recovery is impossible when the normal recovery is not performed even though the system is reset a plurality of times. Thereby, it is possible to prevent in advance the failure or destruction of the portable electronic device.

Figure 7:
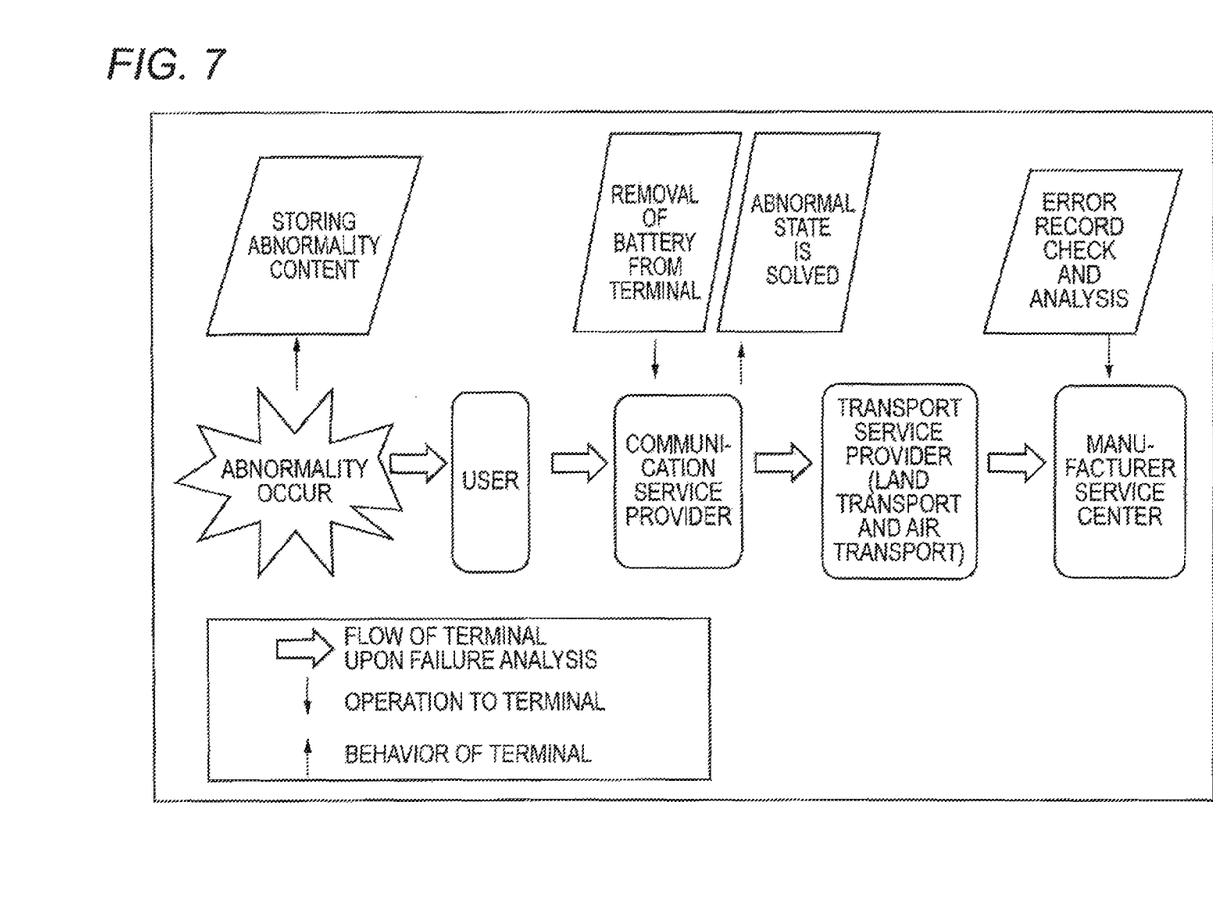
FIG. 7 is a diagram showing the flow of the portable electronic device in failure analysis and the operation and behavior of the portable electronic device.

On the other hand, conventionally, the reproduction of an abnormal state is time-consuming FIG. 7 shows a flow of the portable electronic device at the time of failure analysis, an operation to the portable electronic device, and the behavior of the portable electronic device.

In FIG. 7, even though the user requests repair because of abnormality occurrence, for example, when the user feels that a battery lifetime is short, the battery is often removed because of a problem of safety in the transportation or a problem of practical management from the reception of the repair request by a dealer including a mobile phone provider to the inspection by a manufacturer service center. Thus, the mobile phone brought into the center is usually recovered from an abnormal mode.

Once the recover is normally performed, it is difficult for a manufacturer to reproduce a current abnormality mode, and an operation test for reproducing the bug has to be performed in a blind way. Thus, a lot of manpower and time are necessary to specify a source of trouble or respond to the trouble. There is a possibility that the manufacturer may have a problem in securing human resources and the user may disadvantageously fail into the same symptoms again without solving the problem if worst comes to worst.

On the other hand, a portable electronic device according to an embodiment of the present invention can reduce the cost or time necessary for maintenance, cause analysis, and repair since a state at the time of abnormality occurrence is recorded. The present invention is usable even for the detection of a software bug for which a vast amount of time is necessary at the time of developing a new model at the next.

Only the mobile phone 100 is illustrated as a portable electronic device according to the above-described embodiment of the present invention, but the present invention is also applicable to portable electronic devices driven by a power supply, for example, PDA (Personal Digital Assistants), electronic databooks, and gaming machines.

All functions provided in the control unit 18 shown in FIG. 3 may be implemented by software, or at least a part thereof may be implemented by hardware.

For example, in the control unit 18 which monitors a current value measured by the power control unit 10, monitors a type of application program being executed, and executes a reset process, or executes a power-off process by the battery 30, when the current value measured by the power control unit 10 exceeds a current threshold value corresponding to a type of application program currently being executed, data processing may be implemented on a computer by one or more programs, and at least a part may be implemented by hardware.

While the present invention has been described in detail and with reference to specific embodiments thereof, it will be apparent to one skilled in the art that various changes and modifications can be made therein without departing from the spirit and scope thereof.

This application is based on Japanese Patent Application No. 2008-019978 filed on Jan. 30, 2008, the contents of which are hereby incorporated by reference.

The invention claimed is:

1. A portable electronic device comprising:
a battery;
a current measurement unit which is connected to the battery and measures a current, the current being output from the battery and flowing through an output current monitoring resistor;
a control unit which can execute a plurality of application programs; and
a storage unit which stores a current threshold value set for each of the plurality of application programs executable by the control unit, wherein the control unit monitors a current value measured by the current measurement unit and a type of application program being executed, and executes a reset process or a power-off process when the current value measured by the current measurement unit exceeds a current threshold value corresponding to the type of application program currently being executed, wherein each current threshold value corresponds to a different application program and each current threshold value is different from the other current threshold values, and wherein the control unit forcibly executes the power-off process in response to the number of times that the current value measured by the current measurement unit exceeds the overcurrent threshold value reaching a predetermined number of times, regardless of the application program being executed.

2. The portable electronic device according to claim 1, further comprising:
a nonvolatile storage unit,
wherein when the current value measured by the current measurement unit exceeds the current threshold value corresponding to the type of application program currently being executed, the control unit stores information indicating the type of application program currently being executed in the nonvolatile storage unit.

3. The portable electronic device according to claim 1, wherein the storage unit stores an overcurrent threshold value which is a value greater than any of the current threshold values as well as the current threshold value set for each application program.

4. The portable electronic device according to claim 3, wherein the predetermined number of times is a plural number.

5. The portable electronic device according to claim 1,
wherein the storage unit stores an overcurrent threshold value which is a value greater than any of the current threshold values as well as the current threshold value set for each application program, and
wherein the control unit executes the reset process in response to the current value measured by the current measurement unit exceeding the overcurrent threshold value.

6. The portable electronic device according to claim 5,
wherein the control unit executes the reset process in response to the current value measured by the current measurement unit exceeding the overcurrent threshold value until the number of times that the current value measured by the current measurement unit exceeds the overcurrent threshold value reaches a predetermined number of times, and
wherein the control unit forcibly executes the power-off process in response to the number of times that the current value measured by the current measurement unit exceeds the overcurrent threshold value reaching the predetermined number of times, regardless of the application program being executed.

7. The portable electronic device according to claim 1, wherein the control unit starts a time measurement when detecting a state where the current value measured by the current measurement unit exceeds the current threshold value set for each of the plurality of application programs, and executes the reset process when the state has continued for a first predetermined time period.

8. The portable electronic device according to claim 7, wherein the control unit executes the reset process while using a different time period for each of the plurality of application programs as the first predetermined time period.

9. The portable electronic device according to claim 1, wherein the control unit monitors a generation of an interrupt process, and
wherein at the time of executing the reset process, the control unit executes the reset process in response to becoming a non-use state where the generation of the interrupt process does not occur for a second predetermined time period.

10. The portable electronic device according to claim 9, wherein the control unit executes the reset process while using a different time period for each of the plurality of application programs as the second predetermined time period.

11. A wireless communication device comprising:
a battery;
a current measurement unit which is connected to the battery and measures a current, the current being output from the battery and flowing through an output current monitoring resistor;
a communication unit which performs wireless communication; a control unit which can execute a plurality of application programs including an application program for controlling communication by the communication unit; and a storage unit which stores a current threshold value set for each of the plurality of application programs executable by the control unit, wherein the control unit monitors a current value measured by the current measurement unit and a type of application program being executed, and executes a reset process or a power-off process when the current value measured by the current measurement unit exceeds a current threshold value corresponding to the type of application program currently being executed, wherein each current threshold value corresponds to a different application program and each current threshold value is different from the other current threshold values, and wherein the control unit forcibly executes the power-off process in response to the number of times that the current value measured by the current measurement unit exceeds the overcurrent threshold value reaching a predetermined number of times, regardless of the application program being executed.

* * * * *